US007780424B2

(12) United States Patent
Parmeter et al.

(10) Patent No.: US 7,780,424 B2

(45) Date of Patent: Aug. 24, 2010

(54) SELF LEVELING DYNAMICALLY STABLE RADIAL BEARING

(75) Inventors: Larry J. Parmeter, Broken Arrow, OK (US); Chad A. Craig, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/255,395

(22) Filed: Oct. 21, 2008

(65) Prior Publication Data

US 2010/0098564 A1 Apr. 22, 2010

(51) Int. Cl.
*F04B 35/04* (2006.01)

(52) U.S. Cl. ............................ 417/423.3; 417/423.12; 384/12

(58) Field of Classification Search ................ 384/117, 384/309, 312, 306, 307, 308, 310, 311; 417/423.3, 417/423.12, 423.13
See application file for complete search history.

(56) References Cited

U.S. PATENT DOCUMENTS 1,907,823 A * 5/1933 Janson ...................... 384/312
3,318,642 A 5/1967 Peterson
3,578,827 A 5/1971 Smith
3,988,046 A * 10/1976 Okano ....................... 384/117
4,097,094 A 6/1978 Gardner
4,300,808 A 11/1981 Yoshioka
4,457,634 A 7/1984 Vinciguerra
4,668,108 A 5/1987 McHugh
4,749,283 A 6/1988 Yokomatsu et al.
4,802,774 A * 2/1989 Pesikov ...................... 384/12
4,815,865 A 3/1989 Gerling
5,003,210 A * 3/1991 Liu et al. ..................... 310/87
5,128,573 A 7/1992 Liu et al.
5,425,584 A 6/1995 Ide
5,603,574 A 2/1997 Ide et al.
5,613,781 A 3/1997 Kuzdzal et al.
5,743,654 A * 4/1998 Ide et al. .................... 384/100
5,872,875 A 2/1999 Halloran et al.
6,091,175 A 7/2000 Kinsinger
6,099,271 A 8/2000 Brookbank
6,196,721 B1 * 3/2001 Farkaly ...................... 384/99
6,457,866 B1 * 10/2002 Scheibl ...................... 384/104
6,527,446 B2 * 3/2003 Lee et al. ..................... 384/99
6,566,774 B2 5/2003 Parmeter et al.
6,956,310 B1 10/2005 Knox
7,066,651 B2 6/2006 Nicholas et al.
2007/0140876 A1 * 6/2007 Parmeter et al. ....... 417/423.11

* cited by examiner

*Primary Examiner*—Devon C Kramer
*Assistant Examiner*—Bryan Lettman
(74) *Attorney, Agent, or Firm*—Bracewell & Giuliani LLP

(57) ABSTRACT

A bearing configuration for use in electrical submersible pumps having improved stability. The bearing configuration comprised of a plurality of pads, each able to freely tilt and adjust to the surface of the shaft.

15 Claims, 4 Drawing Sheets

SELF LEVELING DYNAMICALLY STABLE RADIAL BEARING

FIELD OF THE INVENTION

This invention relates in general to submersible pump motors, and in particular to the incorporation of bearings that provide increased stability.

BACKGROUND OF THE INVENTION

A submersible pump is a centrifugal pump having a submersible motor that rotates a shaft to drive a pump. The submersible pump is for producing high volumes of oil and water. A typical submersible pump motor may be from 6-60 feet in length and be rated at several hundred horsepower. Each motor has a stator secured within a tubular housing. A rotor secured to the shaft rotates within a stator.

Because of the long length of the motor, the rotor is made up of a number of rotor sections. Each rotor section comprises a large number of flat disks called laminations that are secured by copper rods. The rotor sections are spaced apart from each other. A bearing assembly is located between each section for maintaining the shaft in axial alignment. The rotor sections are keyed to the shaft for rotation therewith, but are axially movable with respect to the shaft.

Traditionally, the bearing assemblies used in motors, seal sections, and pumps of electrical submersible pumps (ESPs) are plain sleeve bearings, which provide radial support. These plain sleeve bearings are not heavily loaded since a large number of bearings are typically used and the ESP units are run in a near vertical orientation. The absence of a substantial load results in an unstable or marginally stable bearing operation that can result in metal-to-metal contact in the bearings, which accelerates bearing failure. Presently, motors using plain sleeve bearings typically have a 50% success rate for passing a vibration test in a test well. Therefore, a need exists for a bearing type that increases the dynamic stability of the bearings.

SUMMARY OF THE INVENTION

An electrical submersible pump assembly for use in a well that has the following elements: 1) an electrical motor having a lubricant-filled housing, a rotor, and a stator; 2) a centrifugal pump having a plurality of pump stages within a housing; 3) a seal section connected between the pump and the motor for sealing well fluid from the motor and for reducing a pressure differential between the lubricant in the motor and the fluid in the wellbore; 4) a shaft extending through the motor, seal section, and pump for driving the pump; 5) a plurality of bearings in the motor, seal section, and pump for stabilizing the shaft, at least one of the bearings having a plurality of pads that act as bearing surfaces, each of the pads capable of tilting in any direction. In this invention, a more stable bearing configuration is used that replaces plain sleeve bearings in ESP units.

DETAILED DESCRIPTION OF THE INVENTION

Figure 1:
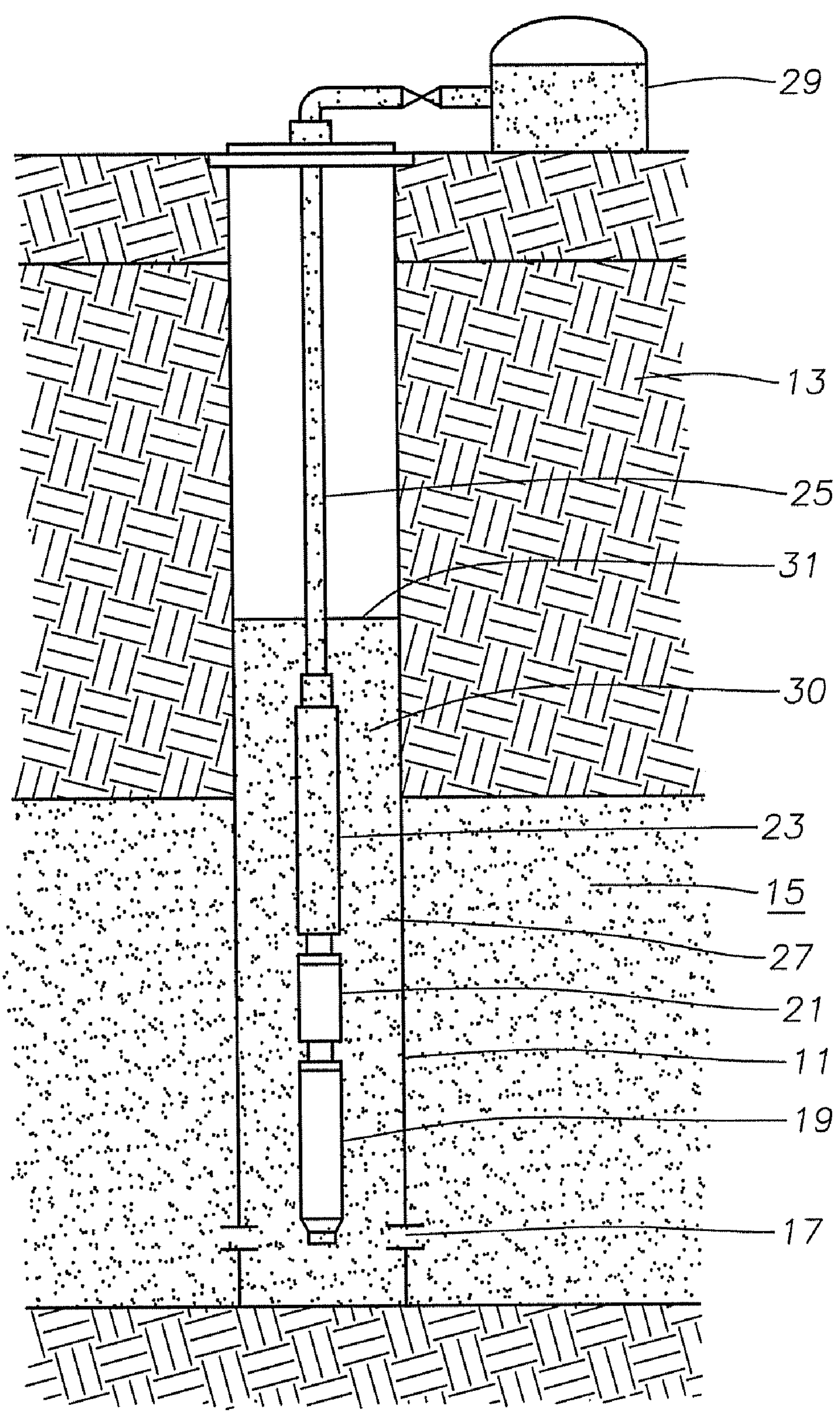
FIG. 1 is a side view of an electrical submersible pump assembly in a well.

Referring now to FIG. 1, a well casing 11 is located within a well in an earth formation 13 and also passes through a producing zone 15. Perforations 17 formed in the well casing enable the fluid in the producing zone 15 to enter the casing 11.

Figure 2:
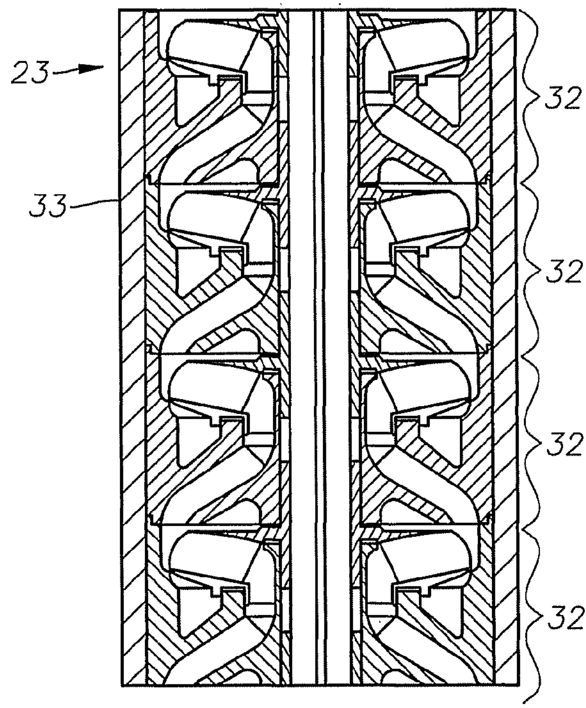
FIG. 2 is an enlarged cross-sectional view of a typical prior art multistate pump for use with the ESP of FIG. 1.

The submersible pump assembly includes an electrical motor 19 that is located in the well. The shaft of motor 19 extends through a seal section 21 and is connected to a centrifugal pump 23. Pump 23 is connected to tubing 25 for conveying well fluid 27 to a storage tank 29 at the surface. The casing 11 will contain an operating fluid level 31 of well bore fluid 30 in the annulus of casing 11. The pump 23 must be capable of delivering fluid 30 for the distance from level 31 to the surface tank 29. Preferably, pump 23 is a centrifugal pump comprised of a plurality of pump stages 32 (FIG. 2) within a housing 33.

Figure 3:
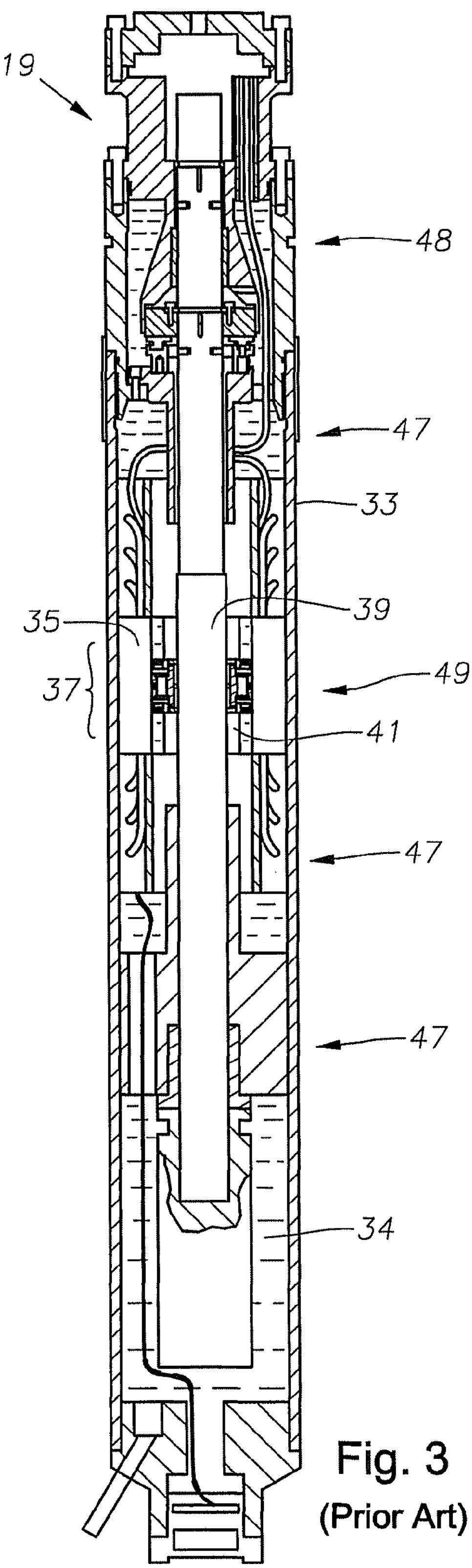
FIG. 3 is a cross-sectional view of a typical prior art downhole motor for use with the ESP of FIG. 1.
Figure 4:
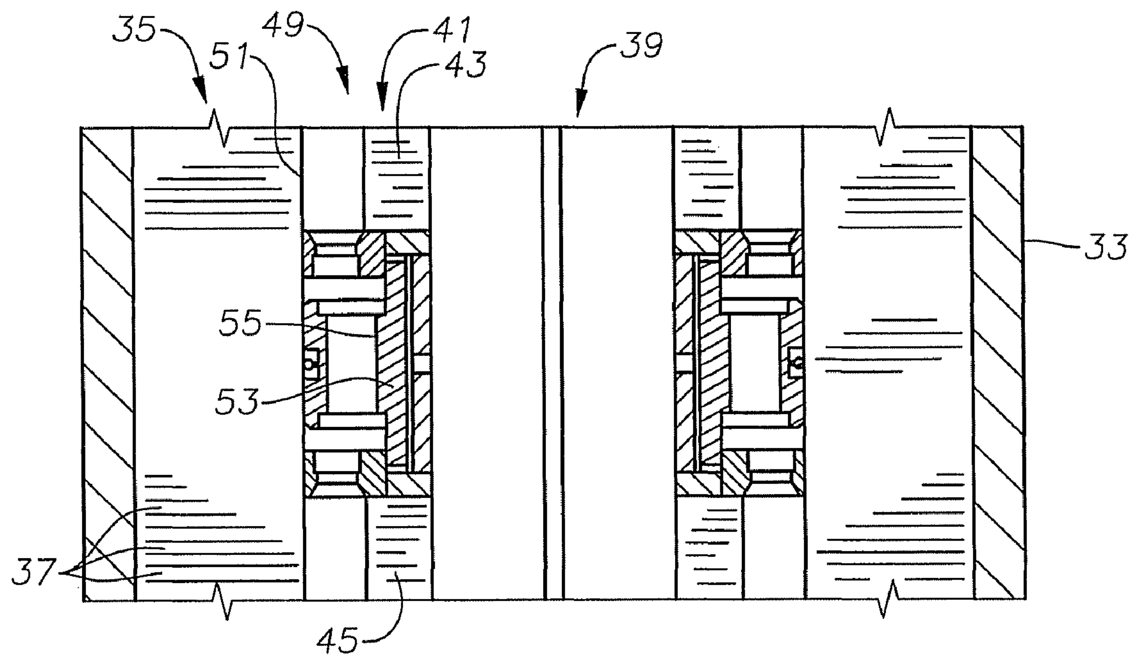
FIG. 4 is an enlarged view of one of the radial thrust bearings shown in the downhole motor of FIG. 1.

Referring now to FIGS. 3 and 4, a prior art submersible pump motor 19 is shown. Submersible pump motor 19 has a housing 33. Housing 33 is preferably filled with a lubricant 34. A stator 35 having a plurality of magnetic laminations 37 is mounted within the housing 33. A shaft 39 extends within stator 35 in motor 19. A rotor 41, having a plurality of spaced-apart rotor sections such as sections 43 and 45 (FIG. 4) are mounted on shaft 39. The shaft 39 is maintained concentrically within motor 19 by a plurality of bearings 47, 48, and 49 that are positioned at selected locations over a length of shaft 39. Bearing 47 comprises a bushing or sleeve pressed into a cylindrical bore in a structural member of motor 19. Bearing 48 is an axial thrust bearing. Bearing 49 is a typical motor bearing.

Figure 5:
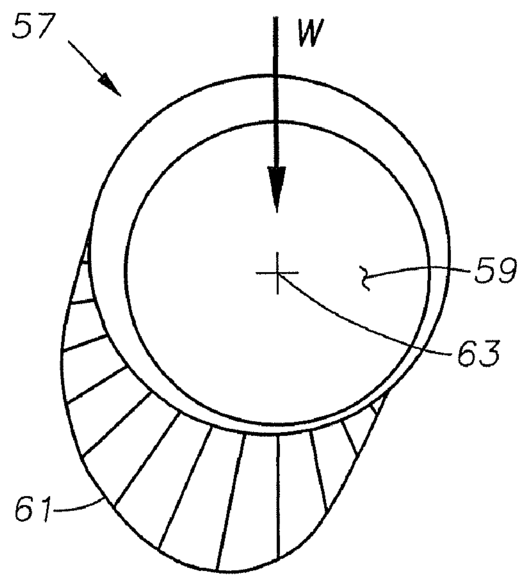
FIG. 5 is a schematic cross-sectional view of a plain sleeve bearing shown undergoing a vertical load transverse to a horizontal shaft.

Referring now to FIG. 4, a typical motor-bearing assembly 49 is shown. The motor-bearing assembly 49 has an outer diameter 51 and a sleeve 53 having an outer diameter 55. The motor bearing assembly surrounds shaft 39 and frictionally engages an inner surface of stator 35. The motor bearing assembly 49 is located between rotor sections 43 and 45, which are mounted onto shaft 39. Referring now to FIG. 5, a plain sleeve bearing 57 is shown schematically with a shaft 59 oriented horizontally. Plain sleeve bearing 57 is shown in typical use experiencing vertical load W perpendicular to shaft 59, which causes shaft 59 to operate in an off-center position with respect to sleeve bearing 57. The resultant of pressure distribution 61 from vertical load W acts through the center 63 of shaft 59 and directly opposes horizontal load W.

However, when used in submersible pump motors such as submersible pump motor 19 (FIGS. 1 and 3), plain sleeve bearing 57 is operated in a vertical position. Therefore, vertical load W perpendicular to shaft 59 does not exist. During vertical use, shaft 59 may be pushed off-center, which will result in a pressure distribution, such as illustrated as pressure distribution 61 in FIG. 5. Pressure distribution 61 does not act through center 63 of shaft 59, but is offset. The offset pressure results in the shaft being pushed off-center where the process repeats. The result is that shaft center 63 moves in a circular orbit. The size of the circular orbit depends on the speed of the shaft as well as the viscosity of the lubricant within the bearing 57.

Figure 6:
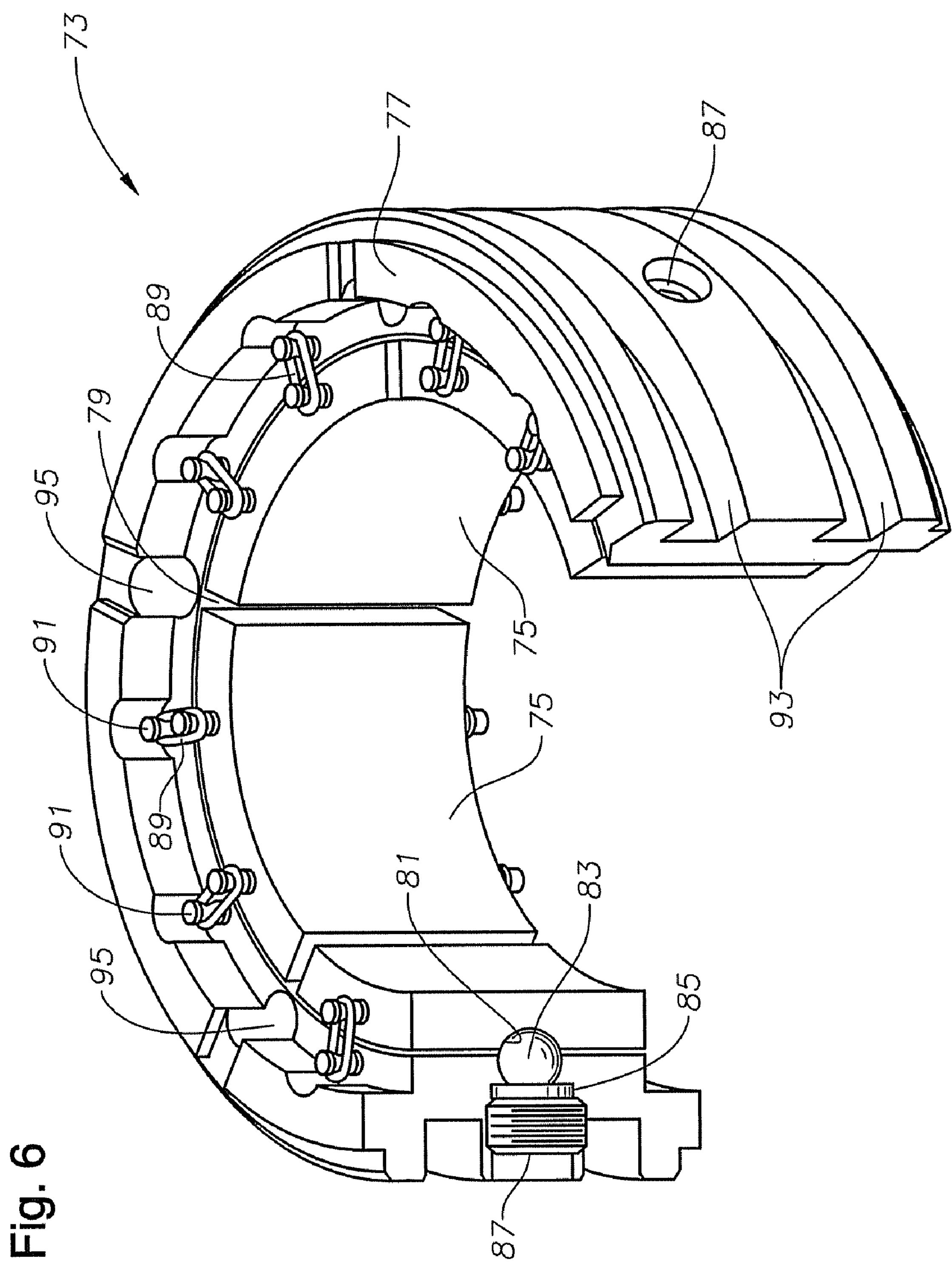
FIG. 6 is a perspective, cross-sectional view of a tilted pad bearing for use with the motor of FIG. 1.

In the preferred embodiment, all of the motor-bearing assemblies 49 (FIGS. 3 and 4) utilize a multi-pad bearing rather than plain sleeve bearings. Referring now to FIG. 6, shown is a tilting multi-pad bearing 73 which may be used for bearings 47, 49 (FIG. 3). Multi-pad bearing 73 has a plurality of segmented floating pads 75 extending around the inner diameter of bearing housing 77. In the preferred embodiment, five pads 75 are evenly disposed around the inner diameter of housing 77, with a small gap 79 between each pad 75. Pads 75 may be made of a number of different materials, depending upon the well conditions. In the preferred embodiment, pads 75 are made of bronze. Each pad 75 is a segment of a cylinder. The inner surface of each pad 75 slidingly engages the rotor shaft 59. The radius of each inner surface is substantially the same as the radius of the shaft 59.

A pocket 81, spherical in shape, is milled into the center of the backside of each pad 75. Each pad 75 rests against a ball bearing 83 that rests in each milled pocket 81. Ball bearing 83 allows each pad 75 to tilt in any direction. In an alternate embodiment, pocket 81 could be offset from the center of each pad 75. On the side opposite each pad 75, each ball bearing 83 is supported by a Belleville washer 85. The spring force of each Belleville washer (spring) 85 can be changed to adjust the desired amount of damping. Each Belleville washer 85 is connected to a set screw 87. Each set screw 87 can be adjusted on the outside of housing 77 to adjust the radial position of each ball bearing 83, and in effect, each pad 75. Pads 75 are connected to housing 77 by a plurality of circular extension springs 89. Extension springs 89 extend between retaining pegs 91, which are mounted on housing 77 and each pad 75. Springs 89 and pegs 91 are located on the top and bottom of each pad 75 and housing 77. Springs 89 ensure that each pad 75 remains in contact with, and retains each ball bearing 83.

Radial bands 93 extend around the outer diameter of housing 77 and accept elastomeric rings such as O-rings (not shown) that act to grip the inner diameter of the stator to prevent rotation of bearing 73. A plurality of cylindrical passages 95 extend axially through housing 77 along the circumference of bearing 73. Passages 95, as well as gaps 79 allow fluid to flow through the bearing 73.

In practice, plain sleeve bearings 57 (FIG. 5), which are traditionally used in a submersible pump motor such as submersible pump motor 19 (FIGS. 1 and 3) are replaced with multi-pad bearings 73 (FIG. 6). When a multi-pad bearing 73 is used, pressure forces are developed from each of the pads 75. The pressure forces tend to stabilize the shaft within the bearing 73. The increased stability is due to the face that each pad 75 is free to tilt or adjust about its ball bearing 83 to the surface of the shaft. The result is an increased stability of operation in a vertical unit utilizing the multi-pad bearings 73. In an alternate embodiment, pocket 81 may be offset from the center of each pad 75. By moving pocket 81 off center in the direction of shaft 59 travel, the load capacity will be increased. This is due to the face that the hydrodynamic oil wedge will occur more easily and thus increase the load capacity. Belleville springs 85 absorb impact blows caused from a bent shaft that otherwise could cause the bearing 73 to break through the stator laminations due to fretting. The magnetic side-pull on the rotors (and bearings) increases with horsepower. As such, dampening forces may need to increase as well, and may be adjusted by varying the spring force of Belleville washers 85. Set screws 87 allow the radial positioning of pads 75 to be adjusted prior to installation.

The invention has several advantages. The reliability of submersible pumping motor units may be greatly increased by the use of dynamic stability bearings. By replacing the plain sleeve bearings within the motor with dynamically stable bearings such as multi-pad bearings, vibration is reduced. The floating segmented pads can self align, preventing half speed oil whirl and dampening excessive side loading.

Although the invention has been shown in only one of its forms, it should be apparent to those skilled in the art that it is not so limited, but is susceptible to change without departing from the scope of the invention. For example, the floating segmented pads could be made of tungsten carbide based on the well conditions. Furthermore, although only the motor of an electrical submersible pump is shown, dynamically stable bearing may also be used in centrifugal pumps and seal sections of an electric submersible pump assembly.

The invention claimed is:

1. An electric submersible pump assembly for use in a well, comprising:

an electrical motor having a lubricant-filled housing, a rotor, a stator, and a shaft having an axis;

a rotary pump driven by the motor;

a plurality of bearings in the motor for radially stabilizing the shaft, at least one of the bearings in the motor being immersed in the lubricant in the motor and having a bearing housing;

bearing surfaces comprising a plurality of pads mounted symmetrically within the bearing housing and about the shaft, wherein a radius of curvature of an inner surface of the plurality of pads is equal to a radius of the shaft;

a pivot element positioned between and in contact with an outer side of each pad and the bearing housing, wherein each pad is pivotable about the pivot element; and at least one pair of retainer spring assemblies for each of the pads, each retainer spring assembly extending from the bearing housing to one of the pads and exerting an outward force on each pad relative to the axis to maintain contact of each pad with the pivot element, one of the retainer spring assemblies in each of the pairs being axially located from the pivot element in one axial direction, and the other of the retainer spring assemblies being axially located from the pivot element in an opposite axial direction.

2. The assembly according to claim 1, wherein each of the retainer spring assemblies comprises an elastic member, a pad mounting member on the pad and a bearing housing mounting member on the bearing housing the elastic member being stretched between the bearing housing mounting member and the pad mounting member.

3. The apparatus according to claim 2, wherein:

said at least one pair of retainer spring assemblies for each of the pads comprises two pairs of retainer spring assemblies for each of the pads, each pair being spaced circumferentially from the other pair, with the pivot element located circumferentially between the two pairs.

4. The apparatus according to claim 1, wherein the inner surface of each pad is made of bronze.

5. The apparatus according to claim 1, wherein the inner surface of each pad is made of tungsten carbide.

6. The apparatus according to claim 1, wherein each pair of retainer spring assemblies comprises:

an upper retainer spring assembly mounted between the bearing housing and an upper end of the pad;

a lower retainer spring assembly mounted between the bearing housing and a lower end of the pad; and wherein the pivot element is located equidistant between the upper and lower ends of the pad.

7. The apparatus according to claim 6, wherein:

the upper retainer spring assembly comprises two upper retainer spring assemblies circumferentially spaced apart from each other;

the lower retainer spring assembly comprises two lower retainer spring assemblies circumferentially spaced apart from each other; and the pivot element is located circumferentially equidistant between the two upper retainer spring assemblies and between the two lower retainer spring assemblies.

8. An electric submersible pump assembly for use in a well, comprising:

an electrical motor having a lubricant-filled housing, a rotor and a stator;

a centrifugal pump having a plurality of pump stages within a housing;

a seal section connected between the pump and the motor for sealing well fluid from the motor and for reducing pressure differential between the, lubricant in the motor and the fluid in the wellbore;

a shaft extending through the motor, seal section and pump for driving the pump;

plurality of bearings in the motor, seal section, and pump for stabilizing the shaft, at least one, of the bearings in the motor being immersed in the lubricant in the motor and having an annular bearing housing;

bearing surfaces comprising a plurality of pads mounted symmetrically within the bearing housing and about the shall, each of the pads having an inner curved surface that faces the shaft;

a semi-spherical recess on an outer side of each pad;

a plurality of ball bearings, each having an inner side portion located in contact with one of the recesses;

a plurality of compression springs, each mounted to the bearing housing and in contact with one of the ball bearings for urging the ball bearings inward against the pads; and a plurality of retainer spring assemblies, each mounted between the bearing housing and one of the pads, the retainer spring assemblies urging the pads outward from the shaft.

9. The apparatus according to claim 8, wherein the bearing housing comprises a sleeve, and the apparatus further comprises:

a plurality of set screws mounted in the bearing housing, wherein each set screw is in contact with an outer side of one of the compression springs, such that a radial position of each pad relative to the shaft can be adjusted independently of the other pads by rotating the set screws.

10. The apparatus according to claim 8, wherein the retainer spring assemblies for each of the pads comprise:

at least one pair of elastic members extending from the bearing housing to the pad, one of the elastic members in each of the pairs being located axially from the ball bearing of the pad in one axial direction and the other of the elastic members being located axially from the ball bearing in an opposite axial direction, the elastic members being in tension.

11. The apparatus according to claim 8, further comprising:

a plurality of holes passing radially through the bearing housing;

a set screw with an inner and outer surface, captured in each hole, with the inner surface in contact with a Belleville washer, and the outer surface exposed for adjustment of the screw within the hole; and the ball bearing being located against the Belleville washer on a side opposite the set screw, such that the set screw can adjust the radial position of each pad relative to the shaft.

12. The apparatus according to claim 10, wherein said at least one pair of elastic members comprises; two pairs of elastic members for each pad.

13. An electric submersible pump assembly for use in a well, comprising:

a housing;

a shaft extending through the housing and having an axis;

at least one bearing in the housing through which the shaft extends, the bearing comprising:

an outer sleeve nonrotatably mounted in the housing;

a plurality of pads spaced around and within the outer sleeve, each pad having a curved inner surface concentric with the outer diameter of the sleeve for engaging the shaft;

a semi spherical recess in an outer side of each pad;

a pivot ball having an inner side located in each recess and protruding radially outward from the pad relative to the axis;

upper and lower tension springs, extending from the sleeve to each pad and being in tension, each upper tension spring extending from an upper end of one of the pads to the sleeve, each lower tension spring extending from a lower end done of the pads to the sleeve, the upper and lower tension springs exerting outward forces on the upper and lower ends of each pad to maintain contact of each pad with the pivot ball;

a plurality of set screws mounted in the sleeve, each set screw being in radial alignment with one of the pivot balls; and a compression spring positioned between an outer side of each pivot ball and each set screw, such that each of the set screws can control the radial position of one of the pads relative to the shaft.

14. The apparatus according to claim 13, further comprising:

at least one upper pad peg protruding upward from the upper end of each pad;

at least one lower pad peg protruding downward from the lower end of each pad;

at least one upper sleeve peg protruding upward from an upper shoulder of the sleeve radially outward from one of the upper pad pegs;

at least one lower sleeve peg protruding downward from a lower shoulder of the sleeve radially outward from one of the lower pad pegs; and wherein each of the tension springs is stretched between adjacent ones of the pad pegs and sleeve pegs.

15. The apparatus according to claim 14, wherein:

said at least one upper pad peg comprises two upper pad pegs spaced circumferentially apart;

said at least one lower pad peg comprises two lower pad pegs spaced circumferentially apart;

said at least one upper sleeve peg comprises two upper sleeve pegs spaced circumferentially apart;

said at least one lower sleeve peg comprises two lower sleeve pegs spaced circumferentially apart; and the ball bearing for each of the pads is positioned circumferentially between the two upper pad pegs and two lower pad pegs.

* * * * *

UNITED STATES PATENT AND TRADEMARK OFFICE

CERTIFICATE OF CORRECTION

PATENT NO. : 7,780,424 B2
APPLICATION NO. : 12/255395
DATED : August 24, 2010
INVENTOR(S) : Larry J. Parmeter et al.

It is certified that error appears in the above-identified patent and that said Letters Patent is hereby corrected as shown below:

Column 1, line 65, insert --stage-- after “multistate”
Column 4, line 46, insert a --,-- after “housing”
Column 5, line 23, insert --a-- before “plurality”
Column 5, line 24, delete “,” after “one”
Column 6, line 27, delete “done” and insert --of one--

Signed and Sealed this
Eleventh Day of January, 2011

David J. Kappos
*Director of the United States Patent and Trademark Office*